(12) United States Patent
Moriya

(10) Patent No.: US 6,202,725 B1
(45) Date of Patent: *Mar. 20, 2001

(54) PNEUMATIC TIRE AND VULCANIZATION MOLD USED FOR THE MANUFACTURE THEREOF

(75) Inventor: Masahiro Moriya, Koganei (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/007,760

(22) Filed: Jan. 15, 1998

(30) Foreign Application Priority Data

Feb. 27, 1997 (JP) .................................................. 9-043279

(51) Int. Cl.[7] .......................... B29C 33/42; B60C 11/12; B60C 115/00
(52) U.S. Cl. ............................... 152/209.23; 152/209.28; 152/DIG. 3; 425/28.1; 425/35; 425/46
(58) Field of Search .................. 152/209 R, 209 D, 152/DIG. 3, 209.18, 209.21, 209.23, 902, 903, 209.28; 425/28.1, 32, 35, 46

(56) References Cited

U.S. PATENT DOCUMENTS

| | | | |
|---|---|---|---|
| 2,121,955 | * | 6/1938 | Eger ................................ 152/DIG. 3 |
| 2,756,460 | * | 7/1956 | Heintz . | |
| 4,298,046 | * | 11/1981 | Herbelleau et al. ............. 152/209 R |
| 4,566,514 | * | 1/1986 | Mauk et al. .................... 152/DIG. 3 |
| 4,815,512 | * | 3/1989 | Gerresheim et al. ................ 152/903 |
| 5,095,963 | * | 3/1992 | Maitre ............................. 152/DIG. 3 |
| 5,385,189 | * | 1/1995 | Aoki et al. ....................... 152/DIG. 3 |
| 5,772,806 | * | 6/1998 | Moriya ............................ 152/DIG. 3 |
| 5,783,002 | * | 7/1998 | Lagnier ........................... 152/DIG. 3 |

FOREIGN PATENT DOCUMENTS

| | | | |
|---|---|---|---|
| 4107547 | * | 9/1991 | (DE) . |
| 195 06 697 A1 | | 8/1996 | (DE) . |
| 0 450 251 A1 | | 10/1991 | (EP) . |
| 705721 | * | 4/1996 | (EP) . |
| 0810 104 A1 | | 12/1997 | (EP) . |
| 779108 | | 3/1935 | (FR) . |
| 3-139404 | * | 6/1991 | (JP) . |
| 5-58118 | | 3/1993 | (JP) . |
| 6-143935 | * | 5/1994 | (JP) ................................ 152/209.18 |
| WO 96/01189 | * | 1/1996 | (WO) . |

OTHER PUBLICATIONS

Translation for German 4107547.*
Patent Abstracts of Japan, vol. 010, No. 122 (M–476), May 7, 1986 & JP 60–252005 A, Dec. 10, 1985 * Abstract, Figs. 1–3.

* cited by examiner

*Primary Examiner*—Steven D. Maki
(74) *Attorney, Agent, or Firm*—Sughrue, Mion, Zinn, Macpeak & Seas, PLLC

(57) ABSTRACT

A pneumatic tire comprises a tread with a plurality of sipes, in which one of opposed wall faces of the sipe is a concave face arc-shapedly curved over a whole of the sipe in a depth direction thereof and the other wall face thereof is a convex face just fitted to the above concave face, and a curvature of each of the concave and convex faces is substantially constant over a full length in a longitudinal direction of the sipe.

9 Claims, 5 Drawing Sheets

FIG_1a
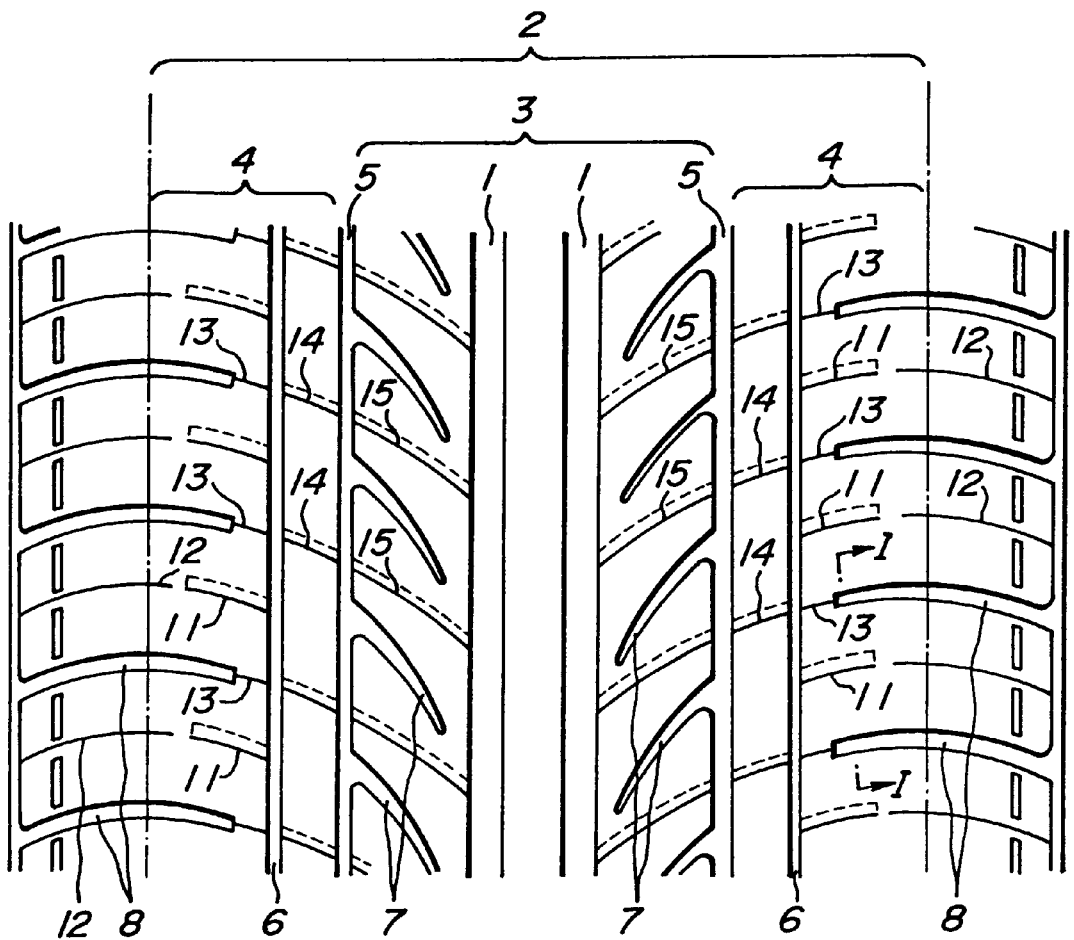
FIG_1b
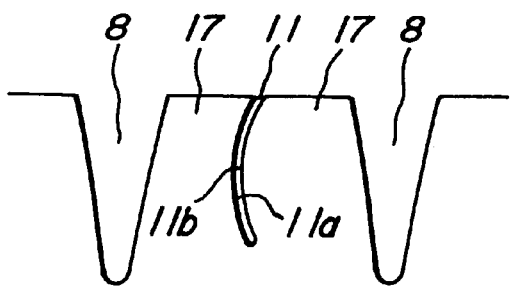

Comparative

Comparative

FIG_5a
PRIOR ART
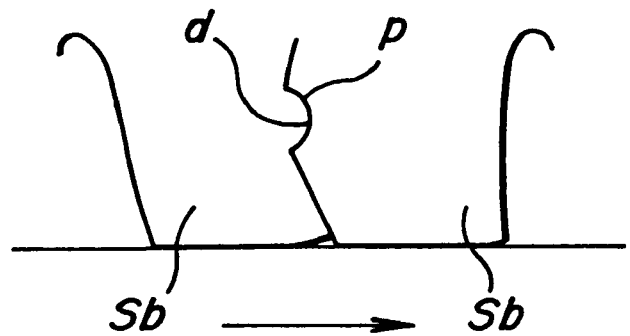
FIG_5b
PRIOR ART
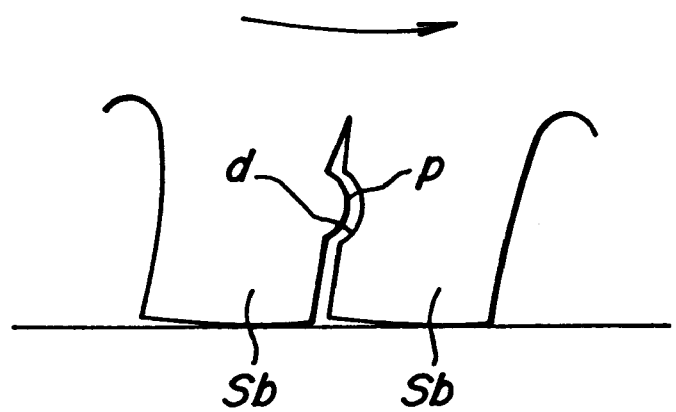

PNEUMATIC TIRE AND VULCANIZATION MOLD USED FOR THE MANUFACTURE THEREOF

BACKGROUND OF THE INVENTION

1. Field of the Invention

This invention relates to a pneumatic tire comprising a tread provided on its land portion or block with a plurality of sipes each cut into a radial direction of the tire and extending substantially in a widthwise direction of the tread and developing excellent wet performances, performances on the ice and the like. This invention also relates to a vulcanization mold used for manufacturing the tire.

2. Description of Related Art

For example, if the sipe is formed in the block, the rigidity of the block having the sipe is necessarily lowered as compared with that of the block having no sipe, whereby it is apt to cause uneven wear such as heel and toe wear or the like. In order to control of the occurrence of such an uneven wear, for example, JP-A-5-58118 has proposed a technique wherein a convex portion is formed in a wall face of the sipe formed in the block to extend in the widthwise direction of the tire and a dimple engaging with such a convex portion is formed in the other wall face of the sipe. This publication discloses that according to this technique, sub-block portions of the block divided by the sipe control the falling with each other based on the engagement between the convex portion and the dimple in the application of braking force to the tire and hence the fallen quantity can be decreased to shorten the braking distance in case of braking on a frozen road surface and control the occurrence of heel and toe wear on a dry road surface.

In such a conventional technique, however, the sizes of the convex portion and the dimple to be formed on the sipe wall faces are small. Hence it is difficult to always produce a reliable engagement of both and hence there is highly caused a fear of providing no given effect. Additionally, when the braking force is applied to the tire, as shown in FIG. 5, the convex portion p of the sipe wall face is engaged with the dimple d of the opposite sipe wall face to restrain the fallings of the sub-blocks sb to each other as shown in FIG. 5a. On the other hand, when the traction force is applied to the tire, the engagement between the convex portion and the dimple is loosened to decrease the restraining force against the falling of the sub-block sb as shown in FIG. 5b. In the conventional tire, therefore, there is a problem that uneven wear is unavoidably caused in the application of the traction force.

SUMMARY OF THE INVENTION

It is, therefore, an object of the invention to solve the above problem of the conventional technique and to provide a pneumatic tire capable of always and effectively stopping the falling deformation of land portions defined by sipes irrespectively of braking and traction states to effectively prevent the occurrence of uneven wear as well as a vulcanization mold used for the manufacture of such a tire.

According to a first aspect of the invention, there is the provision of a pneumatic tire comprising a tread provided on its land portion with a plurality of sipes each cut into a radial direction of the tire and extending substantially in a widthwise direction of the tread, in which one of opposed wall faces of the sipe is a concave face arc-shapedly curved over a whole of the sipe in a depth direction thereof at a section in a normal direction with respect to the tread surface and the other wall face of the sipe* is a convex face just fitted to the above concave face, and a curvature of each of the concave and convex faces is substantially constant over a full length in a longitudinal direction of the sipe.

In such a pneumatic tire, the concave face and the convex face are formed over the whole of the wall face of the sipe in the depth direction and the longitudinal direction thereof, respectively. Also, the sizes thereof are fairly large as compared with those of the conventional technique, so that the fitting of the convex face into the concave face is carried out smoothly and surely. Even if a top of the convex face does not surely correspond to a valley of the concave face, such a top is always contacted with any portion of the concave face, so that the falling deformation of the land portions defined by the sipe are sufficiently restrained by engaging the land portions with each other. This is caused in both the application of braking force to the tire and the application of traction force to the tire, so that the occurrence of uneven wear in the land portion can effectively be prevented.

In the invention, it is enough to arrange the sipe having the concave face and the convex face at its opposed wall faces in at least a shoulder region for controlling the occurrence of uneven wear, particularly step-wise wear at this region. If necessary, when sipes existing in the side region and central region of the tread are also rendered into the structure having a concave face and a convex face at opposed wall faces, the effect of preventing the occurrence of uneven wear can be more improved. In the pneumatic tire, the sipes open at one widthwise end to a circumferentially extending groove. The sipes open at another widthwise end to a second circumferentially extending groove. At the tread surface, each of the sipes are arcuate. The sipes are aligned at a widthwise end with laterally extending grooves. The land portion is separated from another land portion by a circumferentially extending groove and the sipes are aligned with sipes in the another land portion.

According to a second aspect of the invention, there is the provision of a vulcanization mold comprising a plurality of blades for the formation of sipes, each of the blades projecting inward in a radial direction on a mold surface for the formation of a land portion of a tire tread and extending substantially in a widthwise direction of the tread, said blade being rendered into a curved shape arc-shapedly curving over a whole of the blade at a section in a direction perpendicular to an extending direction of a top face of the blade and the curved shape being substantially constant over a length of the blade in a longitudinal direction thereof.

In such a vulcanization mold, a sipe having a concave face and a convex face at its opposed wall faces can be formed simply and easily and exactly by the action of the blade arc-shapedly curved over a whole of the blade in the projecting direction.

Since the blade has a curved shape over the whole thereof in the projecting direction, the depth of the concave face and the height of the convex face in the wall faces of the sipe can sufficiently be made large. On the other hand, the gradient of the curved shape of the blade is made sufficiently small, whereby the resulting vulcanized tire can easily and smoothly be taken out from the mold.

Moreover, the curved shape of the blade is substantially constant over the full length thereof and the blade itself has substantially a simple gutter shape, so that the blade having given shape and size can be produced fairly simply, easily and exactly as compared with a case of gradually changing a form of the blade at any positions in the projecting direction and at any positions in the longitudinal direction.

It is favorable that the curved shape of the blade has a relation of d≧2t wherein d is a most depth of an inner concave face in the projecting direction and t is a thickness of the blade.

BRIEF DESCRIPTION OF THE DRAWINGS

The invention will be described with reference to the accompanying drawings, wherein:

FIG. 1a is a developed view of a tread pattern in an embodiment of the pneumatic tire according to the invention;

FIG. 1b is a diagrammatically section view taken long I—I line of FIG. 1a;

FIGS. 5a and 5b are diagrammatically section views illustrating a deformation behavior of a land portion in a tread of the conventional tire, respectively.

DESCRIPTION OF PREFERRED EMBODIMENTS

Figure 2A:
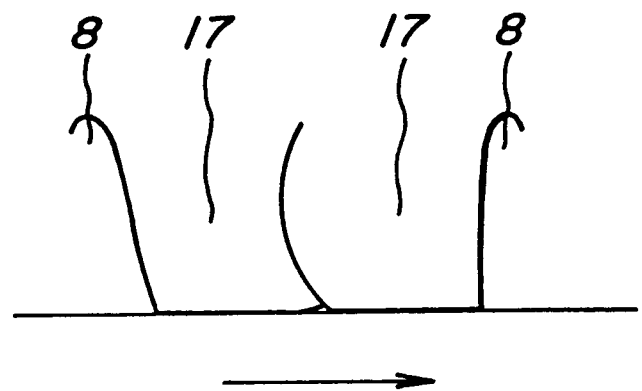
FIGS. 2a and 2b are diagrammatically section views illustrating a deformation behavior of a land portion in a tread of the pneumatic tire according to the invention, respectively.

In FIG. 1a is shown a tread pattern of an embodiment of the pneumatic tire according to the invention. The illustrated tread pattern is defined as follows. That is, two circumferential main grooves 1, 1 continuously extending in a circumferential direction are arranged in a central portion of a tread, and a pair of circumferential sub-grooves 5, 5 are arranged sideward from the circumferential main grooves 1, 1 to divide a ground contact portion 2 of the tread into a central region 3 and both side regions 4 and further a circumferential fine groove 6 is arranged in each of the side regions 4. And also, a plurality of slant grooves 7 are arranged so as to open an end of each slant groove to the circumferential sub-groove 5 and extend the other end toward the circumferential main groove 1 (extend obliquely downward toward the circumferential main groove without opening thereto in the illustrated embodiment). A plurality of lateral grooves 8 extend curvedly upward at somewhat convex shape and opening to an end of the tread are arranged in a portion located sideward from the circumferential fine groove 6 in a widthwise direction of the tread. Furthermore, a shoulder sipe 11 and a buttress sipe 12 having the same curving tendency as the lateral groove 8 are arranged between the circumferential fine groove 6 and the tread end and between adjoining lateral grooves 8 and separated slightly from each other in the widthwise direction of the tread so as to locate on a phantom curved line, while a fine sipe 13 located between an end of the lateral groove 8 and the circumferential fine groove 6, a side region sipe 14 located between the circumferential fine groove 6 and the circumferential sub-groove 5, and a central region sipe 15 located between the circumferential sub-groove 5 and the circumferential main groove 1 are arranged in a zone ranging from the end of each of the lateral grooves 8 to the circumferential main groove 1 so an to extend at the same curving tendency as the lateral groove 8 and locate on a phantom curved line continuing with the lateral groove 8.

In this case, each of these sipes 11–15 is formed by cutting in the radial direction of the tire and orientationally extends in the widthwise direction of the tread.

In the above tread pattern, the shoulder sipe 11, side region sipe 14 and central region sipe 15 among these sipes 11–15 have particularly a structure that one of opposed wall faces of the sipe is a concave face arc-shapedly curved over a whole of the sipe in a depth direction thereof at a section in a normal direction with respect to the tread surface or the extending direction of the sipes 11, 14, 15 and the other wall face of the sipe is a convex face just fitted to the above concave face, and a curvature of each of the concave and convex faces is substantially constant over a full length of the sipe 11, 14, 15 in a longitudinal direction of the sipe.

FIG. 1b illustrates a section view of the shoulder sipe 11 in the direction of normal line as an example, in which one sipe wall face 11a is a concave face arc-shapedly curved over the whole of the sipe in the depth direction thereof and the other sipe wall face 11b is a convex face just fitted to the above concave face.

Moreover, the bottom of each of the sipes 11, 14, 15 may be so-called flask-type bottom arc-shapedly enlarging and terminating at the section in the direction of normal line.

And also, a deviation quantity of each of the concave face and the convex face from an opening of the sipe 11, 14, 15 at a plan view of the sipe is substantially equal over the whole of the sipe in the longitudinal direction thereof as shown by dotted lines in FIG. 1a.

In case that the sipes 11, 14, 15 have the above structure, the regions of the opposed wall faces of the sipe forming the concave face and the convex face extend over the whole of the sipe wall face, so that the fitting of the convex face into the concave face is carried out sufficiently smoothly and surely and the falling deformation of land portions defined by the sipes during the running of the tire under load is effectively restrained by engaging the land portions with each other based on the above fitting and hence the occurrence of uneven wear such as heel and toe wear or the like is effectively prevented in the land portion. This is substantially similar even in case of contacting the top of the convex face with a position other than the valley of the concave face.

Figure 2B:
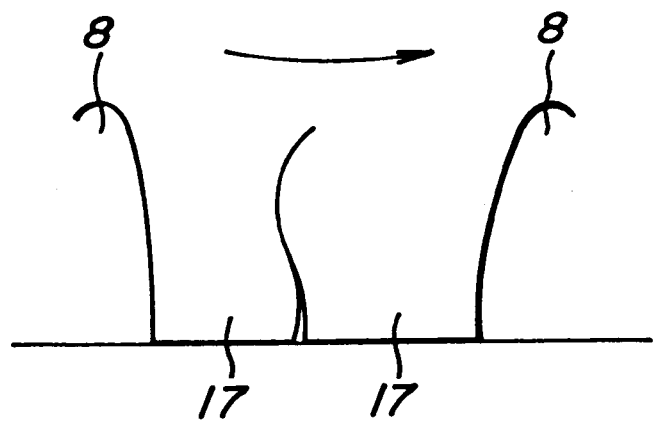

FIG. 2 illustrates a section view of a land portion in the radial direction of the tire illustrating the behavior of the sipe 11. In this case, when braking force is applied to the tire, as shown in FIG. 2a, the convex face of the sipe wall face 11a in fitted into the concave face of the sipe wall face 11b to closely contact both faces with each other, whereby the falling deformation of the land portions 17 defined by the sipe 11 is effectively restrained, while when traction force is applied to the tire, as shown in FIG. 2b, the convex face and the concave face are fitted into each other over a wider area in the depth direction of the sipe 11 to bring about the substantial reduction of the sipe depth and hence the falling deformation of the land portions 17 is sufficiently restrained by engaging the land portions 17 with each other. Therefore, the uneven wear of the land portions in the tread can effectively be prevented even in the application of both the braking force and the traction force to the tire.

Figure 3:
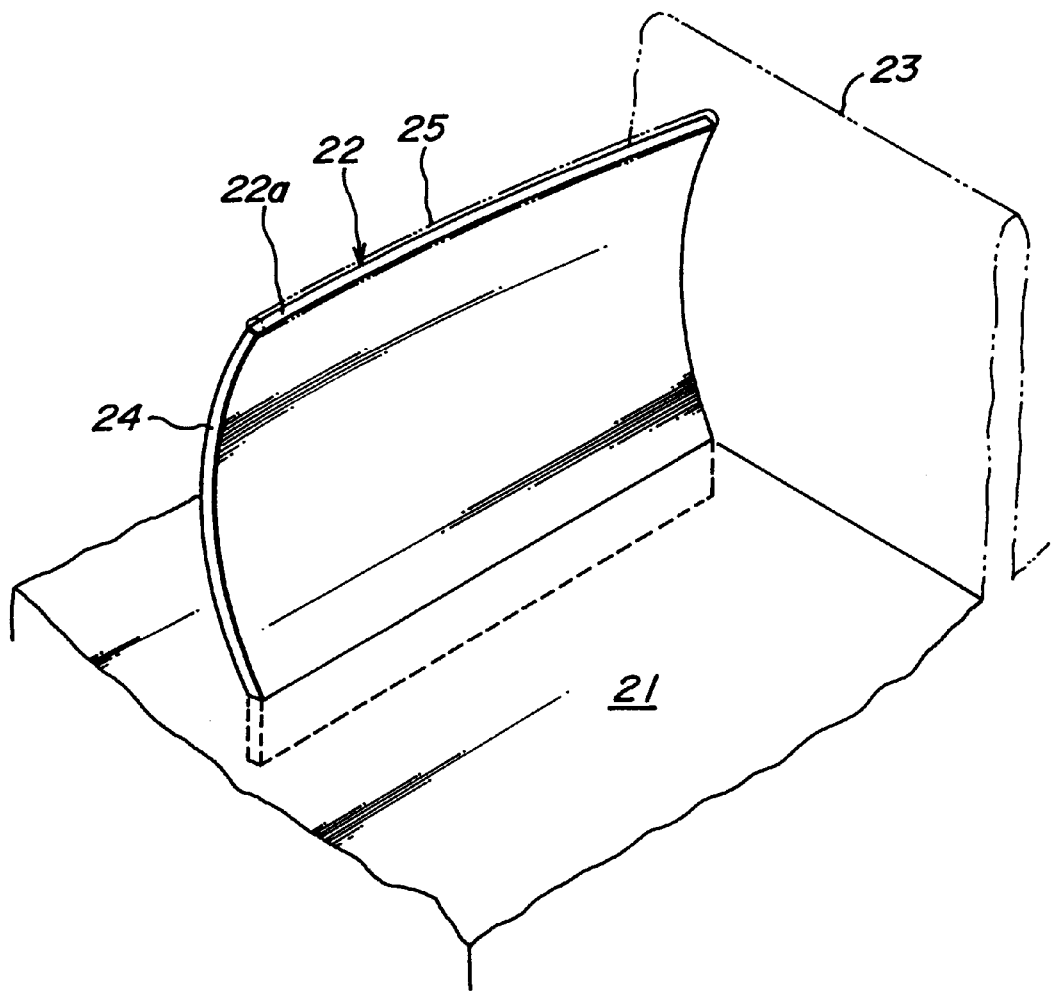
FIG. 3 is a partly broken perspective view of an embodiment of the vulcanization mold according to the invention enlargedly illustrating a blade.

In the manufacture of the pneumatic tire as mentioned above, it is favorable to use a vulcanization mold as shown by a partly broken perspective view of an enlarged main part of the mold in FIG. 3. A metal blade 22 for the formation of the sipe is projected inward in a radial direction on a mold surface 21 for the formation of a land portion of a tire tread inward in a radial direction or upward in the xadial direction in the illustrated embodiment. It is a curved shape arc-shapedly curving over a whole of the blade at a section toward either of both surfaces in a direction perpendicular to an extending direction of a top face 22a of the blade and the curved shape is substantially constant over a full length of the blade 22 in a longitudinal direction thereof. A line connecting an end of a blade 22, positioned at the surface 21 of the mold to an opposite side of the blade is substantially perpendicular to the mold surface.

Since the metal blade 22 is comprised of a thin plate material, when the curved shape of the blade is convex at either of both surfaces, the resulting convex surface and concave surface are shapes corresponding to each other and hence the convex surface contributes to form the concave face of the sipe wall face and the concave surface contributes to form the convex face thereof.

When such a vulcanization mold is used to build up the pneumatic tire through vulcanization, a land portion of a tread is formed by the mold surface 21, and a groove continuously extending in a circumferential direction is formed by a protrusion 23 shown by a phantom line, and slant grooves 7 and lateral grooves 8 are formed by protrusions not shown, while the concave face and convex face of opposed wall faces in each of the sipes are simply, easily and exactly formed by the metal blade 22 as is expected.

Furthermore, a curved portion 24 of the blade 22 is curvedly formed over the whole of the blade in the projecting direction, so that the depth of the concave face and the height of the convex face in the sipe can properly be made large. Even if the size becomes large, a gradient of each of the concave surface and the convex surface can sufficiently be made small in the curved portion 24 formed over the whole of the blade 22 in its projecting direction, so that the tire after the vulcanization can always be taken out easily and smoothly from the mold.

Since the blade 22 is arc-shapedly curved toward one side in the direction perpendicular to the extending direction of the top face of the blade and has substantially a simple gutter shape as a whole, the formation of the blade having given shape and size can simply and easily be carried out and also the formation accuracy can sufficiently and stably be increased.

Consequently, it is possible to efficiently produce the blade 22 with a fairly excellent working accuracy as compared with a case that the curved form, bent form or the like of the blade is gradually changed every given position in the projecting direction and the longitudinal direction. Further, it is possible to produce plural kinds of blades from a single blade member produced with a sufficient size accuracy by cutting into given sizes.

Moreover, a linear member 25 having an arc shape at its lateral section as shown by a phantom line in FIG. 3 may be disposed on the top face 22a of the blade 22, whereby the bottom of the resulting sipe may be a flask-type bottom terminating at an arc-shapedly enlarged state.

The following example is given in illustration of the invention and is not intended as limitation thereof.

A pneumatic tire according to the invention having a tire size of 205/65R15 and a tread pattern as shown in FIG. 1 is manufactured by using a vulcanization mold provided with blades as shown in FIG. 3 and then evaluated with respect to the resistance to uneven wear as follows.

In the invention tire, only a shoulder sipe 11 is formed by using a metal blade 22 having a length of 10 m and a projecting height from a mold surface 21 of 5.4 mm and a protruding quantity of a curved portion 24 of 1.5 mm.

The thus obtained invention tire is mounted onto a rim of 6 ½ and inflated under an air pressure corresponding to a design normal load defined according to JIS D4202 and actually run over a distance of 10000 km. Thereafter, a quantity of step difference of heel and toe wear is measured to obtain a result as shown in Table 1. Moreover, the resistance to uneven wear is represented by an index of the measured value on the basis that comparative tire 1 is 100.

Figure 4A:
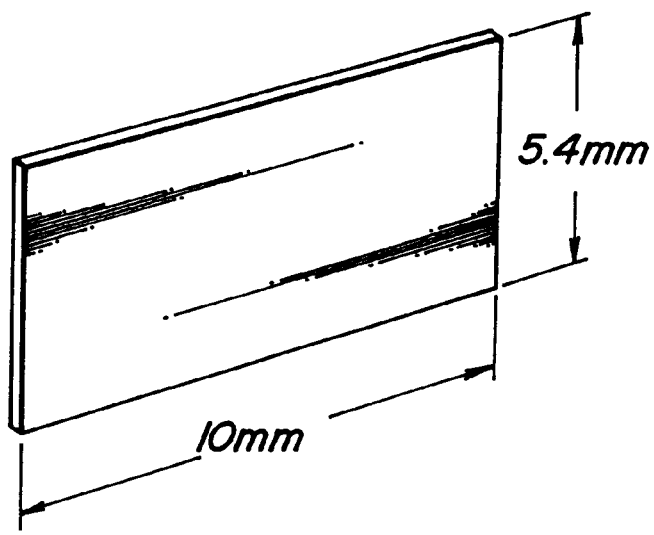
FIGS. 4a and 4b are schematic views of blades used for the manufacture of comparative tires, respectively.

The comparative tire 1 is manufactured by using a vulcanization mold having the same structure as in the vulcanization mold according to the invention except that flat blades having no curved and bent portion as shown in FIG. 4a are used for the formation of sipes.

Figure 4B:
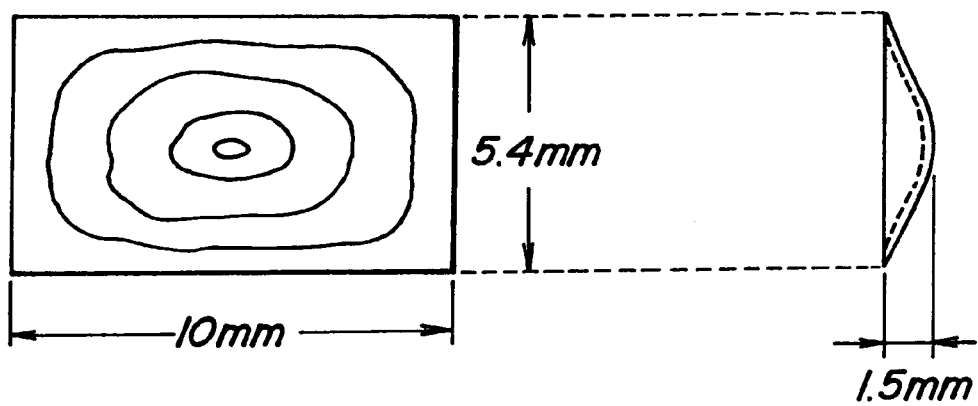

For comparison, a comparative tire 2 is manufactured by using a vulcanization mold having the same structure as in the vulcanization mold according to the invention except that blades each having a mountain-shaped projected central portion as shown in FIG. 4b are used for the formation of sipes.

In Table 1 is also shown a degree of production difficulty of the blade itself in the vulcanization mold used for the manufacture of the tire.

TABLE 1

|  | Resistance to uneven wear | Degree of production difficulty of blade |
| --- | --- | --- |
| Comparative tire 1 | 100 | very easy |
| Comparative tire 2 | 115 | difficult |
| Invention tire | 110 | easy |

As seen from Table 1, the invention tire can largely improve the resistance to uneven wear as compared with the comparative tire 1.

As regards the resistance to uneven wear, the comparative tire 2 exhibits a good result as compared with the invention tire. In the comparative tire 2, however, it is necessary to use a plurality of blades being very difficult in the production of the blade. Therefore, the invention tire is most favorable in practical use because it can easily be manufactured by using the vulcanization mold provided with a plurality of blades being easy in the production of the blade.

As mentioned above, in the pneumatic tire according to the invention, the falling deformation of land portions defined by sipes are effectively restrained irrespectively of braking stage and traction stage, whereby the occurrence of uneven wear in these land portions can effectively be prevented.

In the vulcanization mold according to the invention, the formation of convex face and concave face in the opposed sipe wall faces can be carried out simply, easily and exactly as is expected. Furthermore, it is possible to properly select the depth of the concave face or the height of the convex face, if necessary, and also the tire after the vulcanization can always be taken out smoothly and easily from the vulcanization mold.

Moreover, the blade for the formation of the sipe used in the vulcanization mold has substantially a simple gutter shape as a whole, so that it can simply and efficiently be produced with a higher working accuracy and hence the number of production steps for the manufacture of the vulcanization mold can be decreased. Also the working accuracy of the tire to be manufactured by using the vulcanization mold can largely be improved.

What is claimed is:

1. A pneumatic tire comprising; a tread having a tread surface, the tread being provided on a land portion of the tread with a plurality of sipes of two different types, each type of sipe being cut in the land portion in a radial direction of the tire and extending substantially in a widthwise direction of the tread in alignment with each other, in which one of the opposed wall faces of one type of sipe has a concave face that is concave and arc-shapedly curved over the entirety of the sipe in a depth direction thereof at a section in a normal direction with respect to the tread surface and the other wall face of the sipe is a convex face complimentary to the concave face, such that a curvature of each of the concave and convex faces is substantially constant over a full length of the sipe in a longitudinal direction of the sipe and a line connecting an outlet of said sipe to a bottom of said sipe being substantially perpendicular to the outer surface of said tread, and a second type of sipe has flat opposing wall faces.

2. A pneumatic tire according to claim 1, wherein said sipes open at one widthwise end to a circumferentially extending groove.

3. A pneumatic tire according to claim 2, wherein said sipes are aligned at another widthwise end with laterally extending grooves.

4. A pneumatic tire according to claim 2, wherein said sipes open at another widthwise end to a second circumferentially extending groove.

5. A pneumatic tire according to claim 1, wherein said sipes are aligned at a widthwise end with laterally extending grooves.

6. A pneumatic tire according to claim 1, wherein at said tread surface each of said sipes are arcuate.

7. A pneumatic tire according to claim 1, wherein each of said sipes have at their radial innermost point an enlarged laterally extending groove portion.

8. A pneumatic tire according to claim 1, wherein said land portion is separated from another land portion by a circumferentially extending groove and said sipes are aligned with sipes in said another land portion.

9. A vulcanization mold comprising; a plurality of blades for forming sipes of two different types, each of the blades projecting inward in a radial direction from a mold surface used for forming a land portion of a tire tread and each of said blades extending substantially in a widthwise direction of the tread and aligned with each other, said blade of one type having a curved shape convexly and arc-shapedly curving over the entirety of the blade at a section in a direction perpendicular to an extending direction of a top face of the blade and the curved shape being substantially constant over a length of the blade in a longitudinal direction thereof and a line connecting an end of a blade positioned at said mold surface to an opposite side of said blade being substantially perpendicular to said mold surface, and the blade of a second type being flat.

* * * * *